(12) United States Patent
Pannekoek et al.

(10) Patent No.: US 10,598,359 B2
(45) Date of Patent: Mar. 24, 2020

(54) MECHANISM FOR LOWERING A POLE

(71) Applicant: Swivelpole Patent Pty Ltd, Mandurah DC, Western Australia (AU)

(72) Inventors: Robert John Pannekoek, Mandurah (AU); Peter Pannekoek, Mandurah (AU)

(73) Assignee: Swivelpole Patent Pty Ltd, Mandurah DC, Western (AU)

( * ) Notice: Subject to any disclaimer, the term of this patent is extended or adjusted under 35 U.S.C. 154(b) by 122 days.

(21) Appl. No.: 15/751,223

(22) PCT Filed: Aug. 10, 2016

(86) PCT No.: PCT/AU2016/050723
§ 371 (c)(1),
(2) Date: Feb. 8, 2018

(87) PCT Pub. No.: WO2017/024348
PCT Pub. Date: Feb. 16, 2017

(65) Prior Publication Data
US 2018/0231224 A1 Aug. 16, 2018

(30) Foreign Application Priority Data

Aug. 11, 2015 (AU) ................................ 2015903211

(51) Int. Cl.
*F16M 11/06* (2006.01)
*F16L 27/08* (2006.01)
(Continued)

(52) U.S. Cl.
CPC ............. *F21V 21/36* (2013.01); *E04H 12/18* (2013.01); *E04H 12/187* (2013.01); *E04H 12/345* (2013.01); *F16M 11/2021* (2013.01); *F16M 13/02* (2013.01); *F21S 8/088* (2013.01); *F21V 21/26* (2013.01); *A01K 39/00* (2013.01);
(Continued)

(58) Field of Classification Search
CPC ......... F21V 21/36; F21V 21/26; E04H 12/18; E04H 12/187; E04H 12/345; F16M 11/2021; F16M 13/02; F16M 2200/021; F16M 2200/044; F21S 8/088; F21S 8/085; F21W 2131/103; A01K 39/00
See application file for complete search history.

(56) References Cited

U.S. PATENT DOCUMENTS 1,102,413 A    7/1914   Jensen
2,669,958 A *  2/1954   Sweeney ............ B23K 37/0426
                                                         269/45

(Continued)

FOREIGN PATENT DOCUMENTS

WO    WO 01/25687 A1    4/2001

OTHER PUBLICATIONS

International Search Report from corresponding International Patent Application No. PCT/AU2016/050723, dated Nov. 24, 2016.

*Primary Examiner* — Tan Le
(74) *Attorney, Agent, or Firm* — Kusner & Jaffe

(57) ABSTRACT

A mechanism for lowering a pole, such as a light pole, is disclosed. The mechanism includes a base arranged to rotate about a vertical axis of a pole portion, and an engaging portion arranged to rotate about an operating axis. The operating axis is in the order of 115° relative to the vertical axis. A pole member is fixed to an arm of the engaging portion.

18 Claims, 5 Drawing Sheets

(51) Int. Cl.

| | |
|---|---|
| *E04H 12/00* | (2006.01) |
| *E04H 12/18* | (2006.01) |
| *E04H 12/34* | (2006.01) |
| *F21V 21/26* | (2006.01) |
| *F21V 21/36* | (2006.01) |
| *F16M 11/20* | (2006.01) |
| *F16M 13/02* | (2006.01) |
| *F21S 8/08* | (2006.01) |
| *A01K 39/00* | (2006.01) |
| *F21W 131/103* | (2006.01) |

(52) U.S. Cl.
CPC ............... *E04H 12/34* (2013.01); *F16L 27/08* (2013.01); *F16M 11/06* (2013.01); *F16M 2200/021* (2013.01); *F16M 2200/044* (2013.01); *F21S 8/085* (2013.01); *F21W 2131/103* (2013.01)

(56) References Cited

U.S. PATENT DOCUMENTS

| | | | |
|---|---|---|---|
| 3,463,916 A | | 8/1969 | De Bella |
| 3,507,402 A | * | 4/1970 | Barbee ............... A47F 5/13 211/204 |
| 4,175,343 A | * | 11/1979 | Mathews ............ D06C 3/08 269/51 |
| 4,565,395 A | | 1/1986 | Rockwood et al. |
| 5,915,742 A | * | 6/1999 | Hung ................. B25B 11/02 269/17 |
| 8,800,219 B2 | * | 8/2014 | Anderson ........... E04H 12/187 52/117 |
| 2009/0190365 A1 | | 7/2009 | Kauffman |
| 2012/0291368 A1 | | 11/2012 | Anderson et al. |
| 2014/0105670 A1 | * | 4/2014 | Plomteux ........... F16C 11/10 403/83 |
| 2014/0360754 A1 | | 12/2014 | Walton et al. |
| 2014/0376240 A1 | | 12/2014 | Richardson |

\* cited by examiner

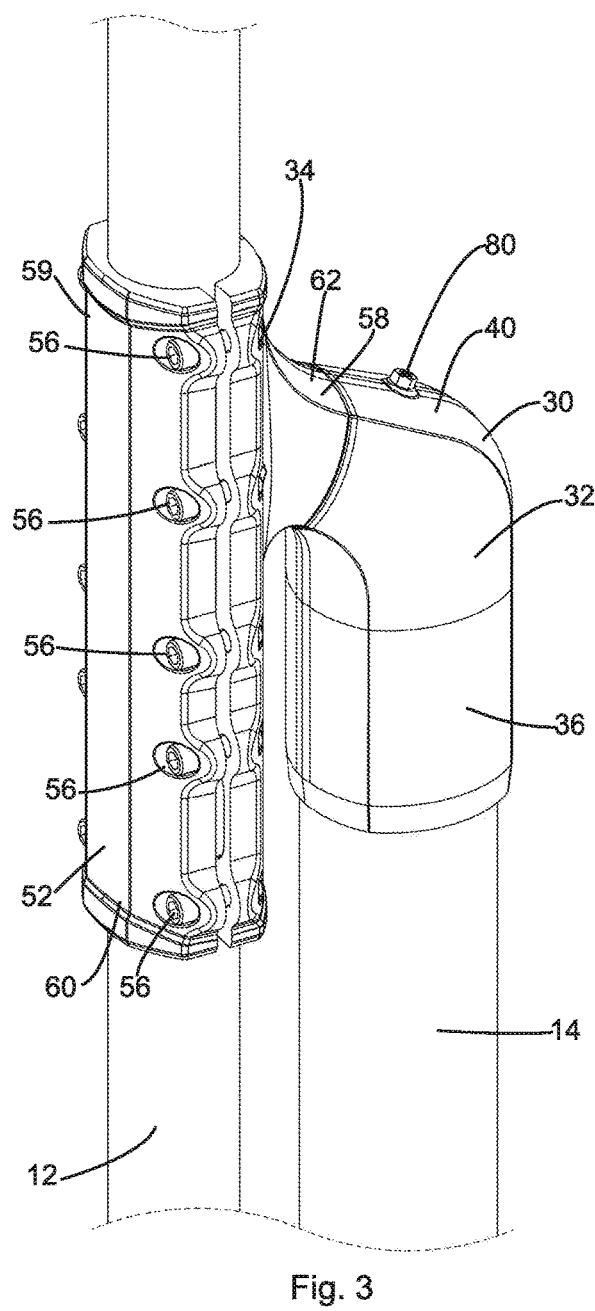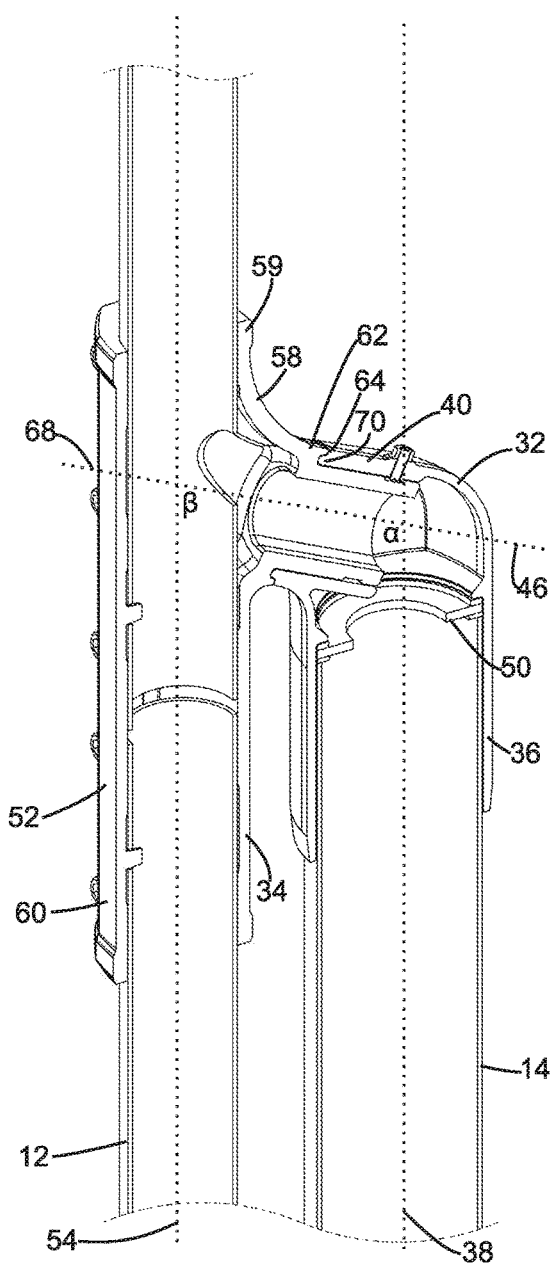
Fig. 3
Fig. 4

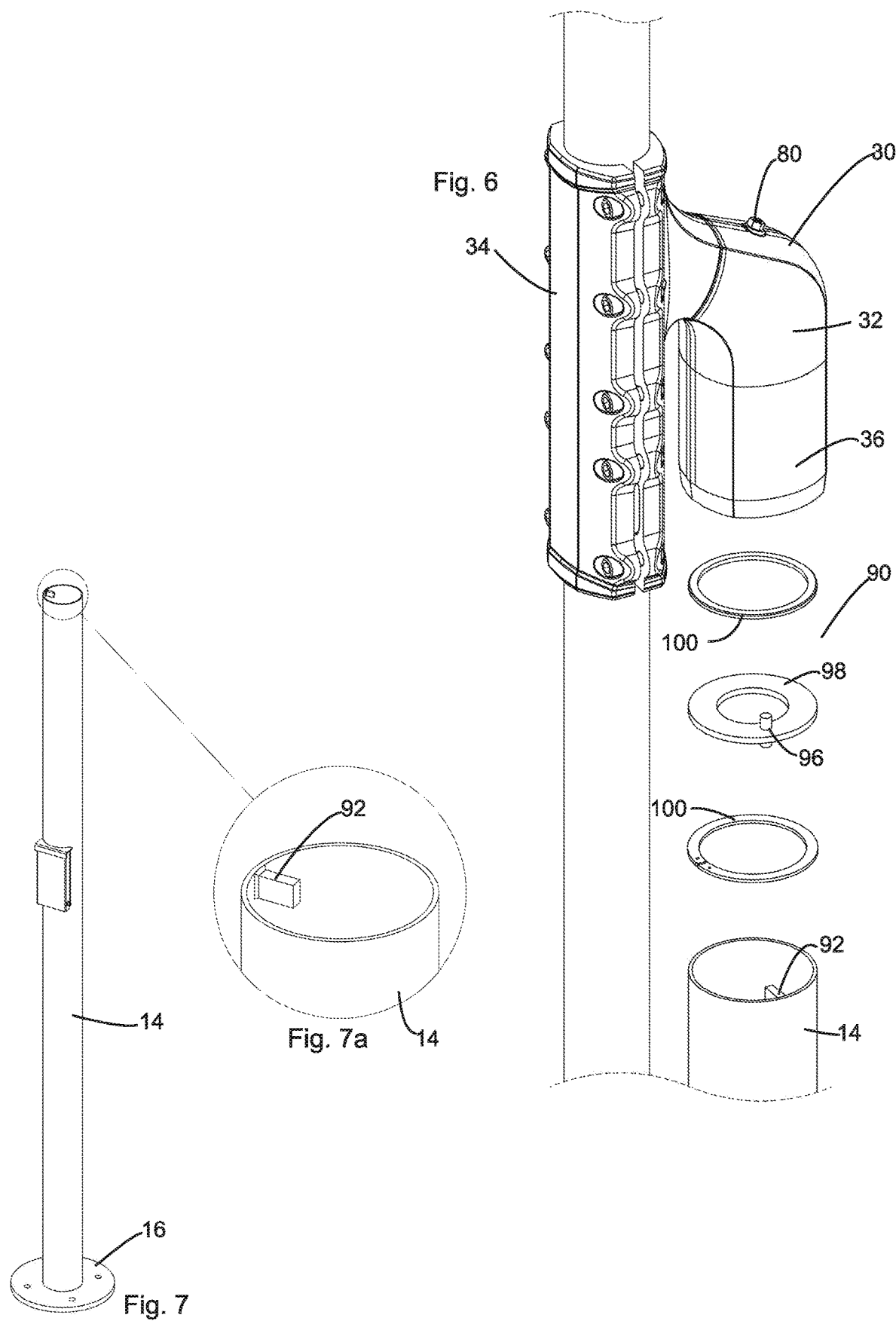

MECHANISM FOR LOWERING A POLE

FIELD OF THE INVENTION

The present invention relates to a mechanism for use in lowering light poles and similar structures. The mechanism has been designed for use in light poles in excess of 4 m in height, although it may be used for any light poles having a light located outside of easy reach. It is anticipated that the mechanism may be used in other poles such as flag poles, or in raised elongate structures.

BACKGROUND TO THE INVENTION

The Swivelpole™ is described in the International Patent Application published as WO0125687, the contents of which are incorporated herein by reference. This product consists of a light pole which has a swivelling joint along its length. The swivelling joint allows for safer and easier changing and repair of lights than had previously been available.

The Swivelpole™ has proved highly successful, and has become an important safety feature in many industrial, mining, and oil-and-gas installations. Nonetheless, the Swivelpole™ is not suitable for all situations. In particular, for poles in excess of 4 m in height, and having a heavy luminaire at the remote end, use of the Swivelpole™ becomes problematic due to the high moment generated by the weight of the luminaire.

The present invention seeks to provide an alternative mechanism for lowering a pole, which may be suitable for relatively high light poles and other structures.

SUMMARY OF THE INVENTION

According to one aspect of the present invention there is provided a mechanism for lowering a pole, the mechanism including:
  a base having a longitudinal axis, the base having a supporting portion fixed thereto, the supporting portion having an operating axis, the operating axis being oriented to the longitudinal axis of the base at a first characteristic angle; and
  an arm having a longitudinal axis, the arm having an engaging portion fixed thereto, the engaging portion being oriented to the arm at a second characteristic angle, the arm having an upper portion extending away from the engaging portion along the longitudinal axis of the arm and a lower portion extending away from the engaging portion along the longitudinal axis of the arm, the upper portion extending in an opposite direction to the lower portion;
  wherein the engaging portion of the arm is arranged to engage with the supporting portion of the base, such that the arm is able to rotate about the operating axis.

Preferably the first characteristic angle is greater than or equal to 90°.

Preferably the first characteristic angle is in the range of 90° to 135°. More preferably, the first characteristic angle is in the range of 100° to 120°. Still more preferably, the first characteristic angle is in the range of 110° to 115°.

Preferably, the second characteristic angle is within 10° of being supplementary to the first characteristic angle. Most preferably, the second characteristic angle is supplementary to the first characteristic angle.

The engaging portion may include a first cylindrical portion and a second cylindrical portion, the second cylindrical portion arranged to locate within the supporting portion, and the first cylindrical portion being between the second cylindrical portion and the upper and lower portions of the arm, the first cylindrical portion having a larger diameter than the second cylindrical portion.

The engaging portion may include an annular recess between the first and second cylindrical portions within which an outer edge of the supporting portion may locate. The outer edge may be an annular lip.

The base may be arranged to locate atop a pole portion. The base may have an internal annular step against which a top of the pole portion may locate.

It is preferred that the base is arranged to rotate about a longitudinal axis of the pole portion atop which it is located.

The mechanism may include rotation limiting means to limit the degree of rotation of the base about the pole portion. In a preferred embodiment, rotation of the base relative to the pole portion is limited to less than 720°.

In the preferred embodiment, rotation of the base relative to the pole portion is permitted through more than 360°. It is preferred that rotation of the base relative to the pole portion is permitted through more than 540°.

The rotation limiting means may include a rotation stop fixed to the base portion. The rotation limiting means may also include an intermediate rotating stop. In the preferred embodiment, the intermediate rotating stop is arranged to rotate in the order of 335° relative to the pole portion; and the base portion is arranged to rotate in the order of 335° relative to the intermediate rotating stop. This permits rotation of the base portion in the order of 670° relative to the pole portion. It is considered that the relative rotations of between 270° and 360° will produce a useful result.

The arm may be arranged to receive a pole member. The arm may have connection means arranged to connect the arm to the pole member.

According to a second aspect of the present invention there is provided a pole arrangement incorporating a lowering mechanism, the pole arrangement including:
  a pole portion fixed to a base location, the pole portion having a longitudinal axis;
  a base of the lowering mechanism, the base having a longitudinal axis coaxial with the longitudinal axis of the pole portion, the base having a supporting portion fixed thereto, the supporting portion having an operating axis, the operating axis being oriented to the longitudinal axis of the base at a first characteristic angle; and
  an arm having a longitudinal axis, the arm having an engaging portion fixed thereto, the engaging portion being oriented to the arm at a second characteristic angle, the arm having an upper portion extending away from the engaging portion along the longitudinal axis of the arm and a lower portion extending away from the engaging portion along the longitudinal axis of the arm, the upper portion extending in an opposite direction to the lower portion;
  a pole member fixed to the arm, the pole member extending away from the arm along the longitudinal axis of the arm, the pole member having a high end and a low end;
  wherein the engaging portion of the arm is arranged to engage with the supporting portion of the base, such that the arm is able to rotate about the operating axis in order to raise or lower the high end of the pole relative to the pole portion.

Preferably the first characteristic angle is greater than or equal to 90°.

The pole member may include a luminaire mounted at the high end thereof. The pole member may include a counterweight located near the low end thereof.

The pole arrangement may include locking means arranged to lock the low end of the pole member to the pole portion.

BRIEF DESCRIPTION OF THE DRAWINGS

It will be convenient to further describe the invention with reference to preferred embodiments of the present invention. Other embodiments are possible, and consequently the particularity of the following discussion is not to be understood as superseding the generality of the preceding description of the invention. In the drawings:

FIG. 3 is a side view of a pole lowering mechanism within the light pole arrangement of FIG. 1;

FIG. 4 is a cross section through the pole lowering mechanism of FIG. 3;

FIG. 6 is an exploded view of a rotation limiting means within the pole arrangement of FIG. 1;

FIG. 7 is a perspective of a pole portion from within the pole arrangement of FIG. 1;

FIG. 7a is an enlarged view of the top end of the pole portion of FIG. 7;

DETAILED DESCRIPTION OF PREFERRED EMBODIMENTS

Figures 1, 2:
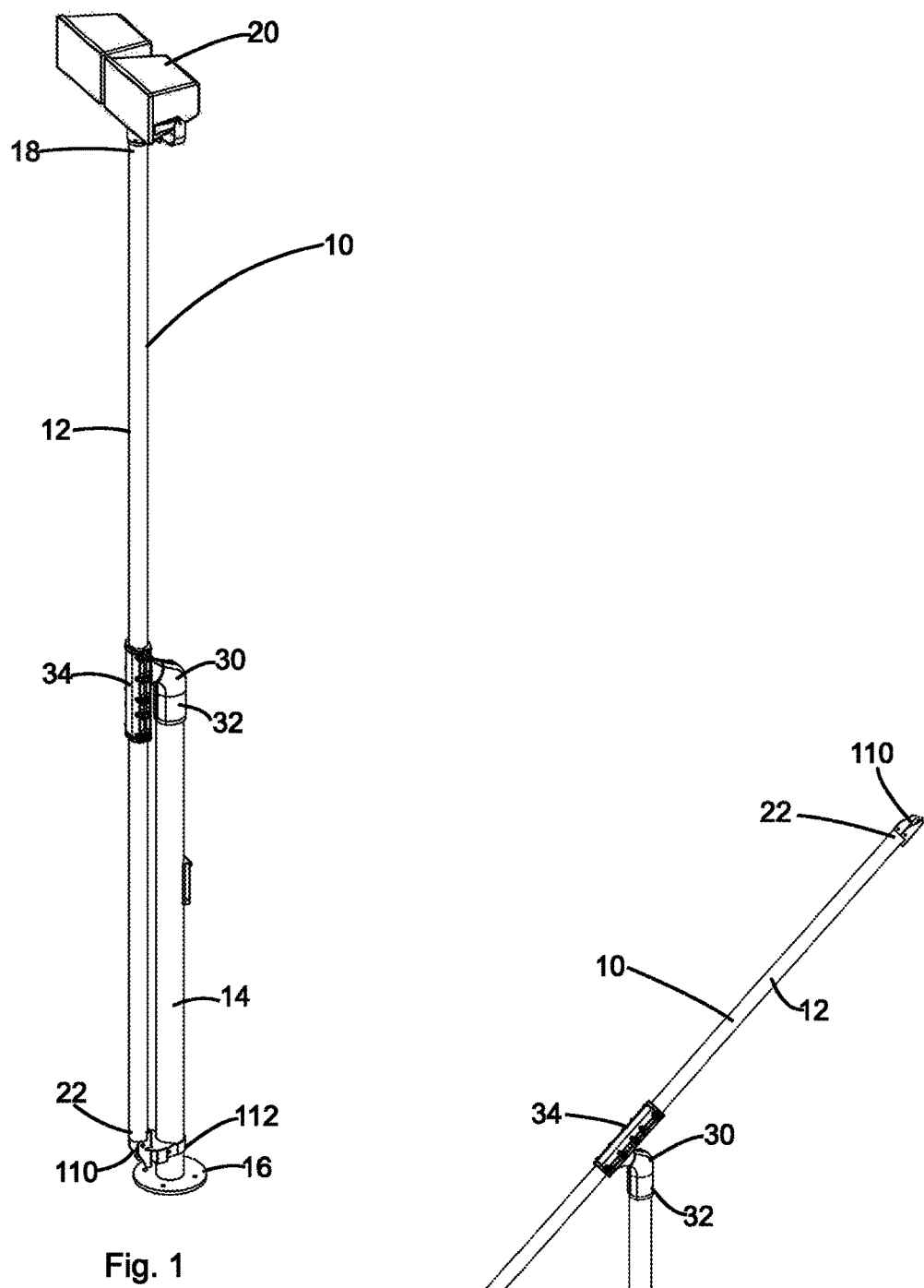
FIG. 1 is a perspective of a light pole arrangement in according with the present invention, shown in a raised configuration.
FIG. 2 is a perspective of the light pole arrangement of FIG. 1, shown in a lowered configuration.
Figure 5:
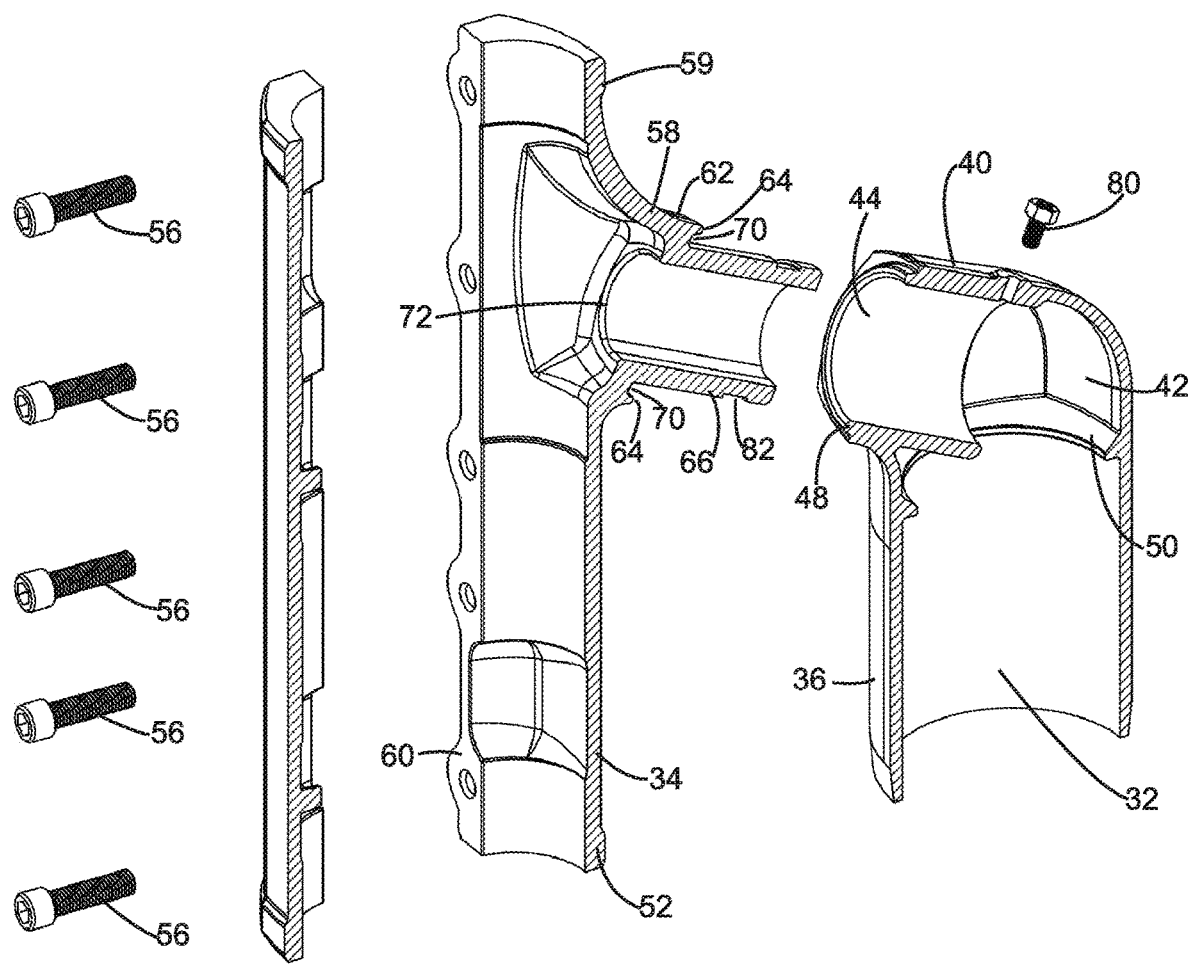
FIG. 5 is a cross section through an exploded view of the pole lowering mechanism of FIG. 3.
Figure 8:
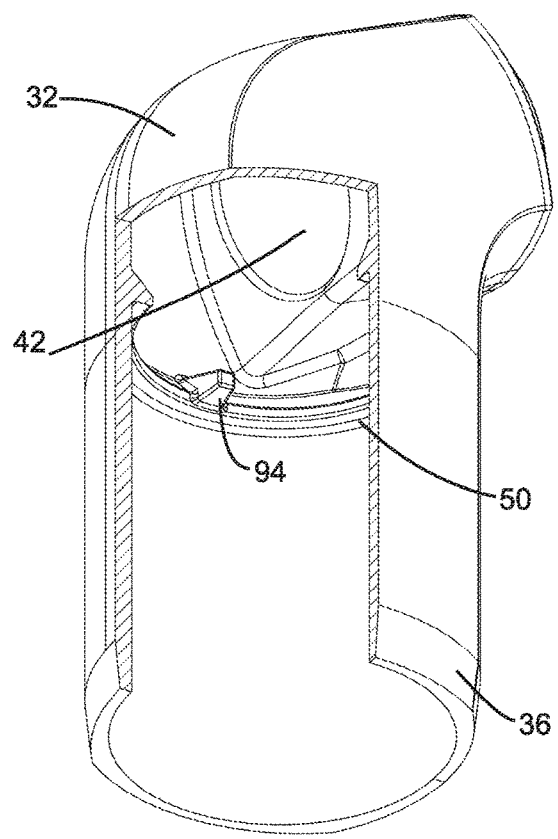
FIG. 8 is a partially cut-away view of a base within the pole lowering mechanism of FIG. 3.

Referring to the Figures, there can be seen a pole arrangement 10 including an elongate pole member 12 and a pole portion 14. The pole portion 14 is fixed to a base 16, which in use is likely to be on the ground. The pole member 12 has a high end 18 on which a luminaire 20 is mounted, and a low end 22. In the embodiment shown the pole portion 14 has a height of between 2 m and 2.5 m, and the pole member 12 has a length of between 4 m and 5 m. It will appreciated that the pole member 12 may be a single contiguous pole, or may be formed by two separate pole portions.

The pole member 12 is mounted to the pole portion 14 by means of a pole lowering mechanism 30.

The pole lowering mechanism 30 has two main pieces: a base 32 and an arm 34.

The base 32 includes a body portion 36 having a longitudinal axis 38. The body portion 36 is cylindrical, and is arranged to locate over and around the pole portion 14.

The base 32 also includes a supporting portion 40, located at an upper end of the body portion 36. The supporting portion 40 is generally cylindrical about an axis 46, and has an inner end 42 and an outer end 44. The supporting portion 40 is oriented to the base 32 at a characteristic angle α of 115°; that is, the angle between the axis 46 of the supporting portion 40 and the longitudinal axis 38 of the body portion 36 is 115°. It is considered that a characteristic angle between 90° and 135° will produce a useful result, with preferred embodiments at 110° to 115°.

The supporting portion 40 is open at the outer end 44. The supporting portion 40 has an annular lip 48 at the outer end 44. The annular lip 48 has a step change in external diameter compared to the remainder of the supporting portion 40, with no change in internal diameter.

At the inner end 42, the supporting portion 40 is contiguous with an upper end of the body portion 36.

The supporting portion 40 is open at inner end 42 to the interior of the body portion 36. The base 32 thus operates as a broadly L-shaped channel.

The body portion 36 includes an internal annular ridge 50 located near its upper end; that is, near the supporting portion 40.

The arm 34 includes a main portion 52 having a longitudinal axis 54. The main portion 52 is formed as an internally cylindrical shell structure, arrange to clamp around the pole member 12 such that the main portion 52 of the arm 34 and the pole member 12 are fixed in a coaxial relationship. This clamping may be achieved via bolts 56. Where the pole member 12 is formed by two pole portions, each may be clamped within the main portion 52 of the arm 54.

The arm 34 also includes an engaging portion 58, extending generally radially away from the main portion 52. The engaging portion 58 thus divides the main portion 52 into an upper portion 59 and a lower portion 60, both of which are located along the longitudinal axis 54.

The engaging portion 58 includes a first generally cylindrical portion 62 projecting away from the main portion 52 to an annular ridge 64, and a second cylindrical portion 66 extending away from the first cylindrical portion 62. The first cylindrical portion 62 and second cylindrical portion 66 are axially aligned along an operating axis 68, which is oriented towards the longitudinal axis 54 at a characteristic angle β of 65° (that is, supplementary to the characteristic angle α).

The engaging portion 58 includes an annular recess 70 located internally of the annular ridge 64, the annular recess being defined by the first and second cylindrical portions 62, 66.

The arrangement is such that the second cylindrical portion 66 has an external diameter slightly less than the internal diameter of the supporting portion 40 of the base 32, such that the second cylindrical portion 66 can be received within the supporting portion 40 in a sliding fit, with the axis 46 of the supporting portion 40 aligning with the operating axis 68 of the engaging portion 58.

The first cylindrical portion 62 has an internal diameter equal to the external diameter of the annular lip 48 of the supporting portion 40, such that the annular lip 48 can locate within the annular recess 70 in a sliding fit. The first cylindrical portion 62 has an external diameter similar to that of the supporting portion 40, such that the external surface of the pole lowering mechanism 30 is generally smooth.

The second cylindrical portion 66 has a length such that, when it is located within the supporting portion 40, an outer edge of the second cylindrical portion 66 locates clear of the opening between the supporting portion 40 and the body portion 36 while the annular lip 48 locates within the annular recess 70.

The main portion 52 of the arm 34 includes a side wall aperture 72 connecting the interior of the main portion 52 with the interior of the engaging portion 58.

The pole lowering mechanism 30 also includes a retaining means in the form of a locating screw 80. The locating screw 80 is located within the side wall of the supporting portion 40, and is arranged to locate within a circumferential recess 82 about the second cylindrical portion 66 of the engaging portion 58.

The pole lowering mechanism 30 includes rotation limiting means 90, as shown in FIGS. 6 to 9. The purpose of the rotation limiting means 90 is to prevent the base 32 from being continuously rotated about the pole portion 14 in the same angular direction and thereby unduly twisting wiring passing through the pole lowering mechanism 30.

The rotation limiting means 90 includes a first rotation stop 92 within the pole portion 14, a second rotation stop 94 within the base 32, an intermediate rotating stop 96 located on a rotating annulus 98, and two supporting rings 100.

The first rotation stop 92 is formed by a radially oriented, internally projecting tab inside an upper end of the pole portion 14.

The supporting rings 100 each have dimensions similar to that of the internal annular ridge 50 of the base 32. In other words, the supporting rings 100 are sized to locate atop the pole portion 14, and inside the body portion 36 of the base 32. They have an outer diameter similar to that of the pole portion 14, and slightly less than the inner diameter of the body portion 36. The supporting rings 100 have an inner diameter similar to that of the internal annular ridge 50. In the preferred embodiment, a lower of the two supporting rings 100 is formed of resilient material such as spring steel, and is arranged to expand radially. In this embodiment, the lower supporting ring 100 has an effective outer diameter equal to the inner diameter of the body portion 36. Friction between the lower supporting ring 100 and the body portion 36 can assist in holding the rotation limiting means 90 in place within the base 32 during assembly.

The rotating annulus 98 has an outer diameter similar to that of the supporting rings 100, and an inner diameter less than that of the supporting rings 100; that is, an inner annular portion of the annulus 98 locates inside the supporting rings 100. The intermediate rotating stop 96 is formed as two axially oriented projections from this inner annular portion, one above the annulus 98 and one below. It will be appreciated that the intermediate rotating stop 96 is clear of the supporting rings 100, such that when the rotating annulus 98 is sandwiched between the supporting rings 100 the intermediate rotating stop does not prevent rotating of the annulus 98 relative to the supporting rings 100.

The second rotating stop 94 is formed by a radially oriented, internally projecting tab immediately above the internal annular ridge 50 of the body portion 36 of the base 32.

The first and second rotating stops 92, 94 each project radially inwardly by a distance similar to the width of the rotating annulus 98. The intermediate rotating stop 96 projects axially above and below the rotating annulus 98 sufficiently far that it overlaps in the axial direction with both the first rotating stop 92 and the second rotation stop 94.

In use, the pole lowering mechanism 30 is arranged as follows: the base 32 is located atop the pole portion 14 with the body portion 36 generally surrounding an upper end of the pole portion 14; a lower supporting ring 100 is located directly atop the pole portion 14; the rotating annulus 98 is located atop the lower supporting ring 100; an upper supporting ring 100 is located atop the rotating annulus 98; the internal annular ridge 50 of the base 32 is located atop the upper supporting ring 100; and the pole member 12 located within the arm 34. This is the arrangement shown in FIGS. 1 to 4.

The pole lowering mechanisms 30 can be used to orient the pole arrangement 10 into a raised configuration whereby the pole portion 12 is parallel to the pole portion 14 as shown in FIG. 1.

The arrangement 10 can be secured in this raised position by connection of the low end 22 of the pole member 12 to the pole portion 14. In the embodiment of the drawings, this is effected by the use of a locking coupling 110 at the lower end 22 of the pole member 12, arranged to be locked to a complementary bracket 112 on the pole portion 14. It is envisaged that security means may be provided to ensure that a key is required to disengage the locking coupling 110 from the bracket 112.

When the pole member 12 is to be lowered (as shown in FIG. 2), this can be effected by disengagement of the locking coupling 110 from the bracket 112, and rotation of the arm 34 relative to the base 32. In order to achieve stable, easy rotation it is anticipated that the pole member 12 may be provided with a counterweight at its low end 22. The counterweight can be chosen such that its moment about the operating axis 68 is similar to the moment of the luminaire 20 about the operating axis 68.

The orientation of the operating axis 68 about the characteristic angle assists in making rotation of the pole member 12 easy to manage for even a single operator. In addition, it allows for the pole member 12 to be positioned in such a way that the lateral position of a lowered luminaire 20 can be chosen for ease of access.

It is expected that a cable may be attached to the low end 22 of the pole member 12, and that manipulation of this cable will permit easy lowering and raising of the pole member 12. It will be appreciated that rotation of the base member 32 about the pole portion 14 will allow the pole member 12 to be lowered into any desired angular position. In this way, the direction of the luminaire 20 in the raised configuration does not determine the orientation of the pole member 12 in a lowered configuration. This is considered particularly advantageous in environments where space may be limited, such as on roadway median strips.

The arrangement of the open inner end 42 of the supporting portion 40, and the open side wall aperture 72 of the arm 34, allows for wiring and cables to be easily located within the mechanism 30 to provide electricity from the base 16 through to either end of the pole member 12. It will be appreciated that rotation of the mechanism 30 in order to lower the pole member 12 causes rolling or curving of the cables, rather than bending. This means that damage to the cables during raising or lowering is considered highly unlikely.

Figure 9A:
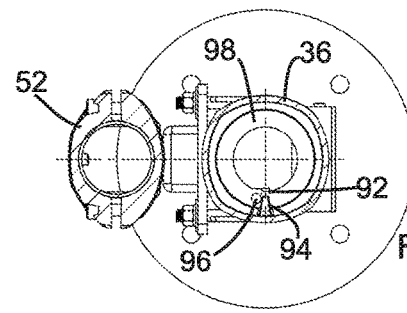
FIGS. 9a to 9c are cross sectional views through the pole arrangement of FIG. 1, demonstrating the operation of the rotation limiting means of FIG. 6.
Figure 9B:
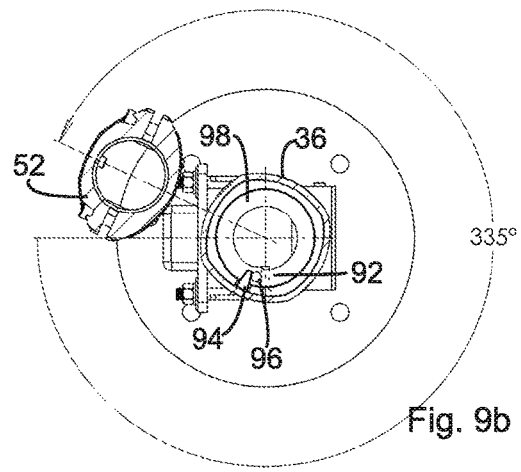
Figure 9C:
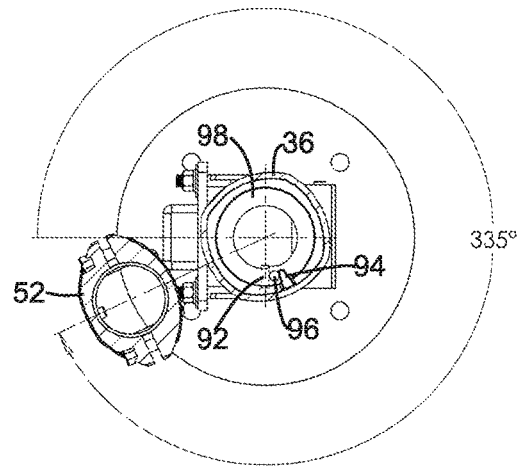

Further, the rotation limiting means 90 prevents the base 32 from being rotated relative to the pole portion 14 in the same angular direction every time the pole member 12 is raised and lowered, thus twisting the cables. The range of movement of the base 32 relative to the pole portion 14 is shown in FIG. 9. The rotating annulus 98 is free to rotate about the pole portion 14 through 335°; that is, from a first angular position where the intermediate rotating stop 96 locates against one side of the first rotation stop 92 to a second angular position where the intermediate rotating stop 96 locates against the other side of the first rotation stop 92.

Similarly, the body portion 36 of the base 32 is free to rotate about the rotating annulus 98 through 335°; that is, from a first angular position where the intermediate rotating stop 96 locates against one side of the second rotation stop 94 to a second angular position where the intermediate rotating stop 96 locates against the other side of the second rotation stop 94.

These two rotation limits are independent, meaning that the base 32 is able to rotate relative to the pole portion 14 through a total of 670°.

If the pole lowering mechanism 30 reaches a rotation limit during operation, an operator can simply raise the pole member 12, rotate it 360° about the pole portion 14, and then continue with the desired lowering operation.

Modifications and variations as would be apparent to a skilled addressee are deemed to be within the scope of the present invention.

The invention claimed is:

1. A mechanism for lowering a pole from a raised configuration whereby an end of the pole is out of easy reach to a lowered position whereby said end is within easy reach, the mechanism including:
a base having a longitudinal axis, the base having a supporting portion fixed thereto, the supporting portion having a longitudinal axis which defines an operating axis, the operating axis being oriented to the longitudinal axis of the base at a first nonzero characteristic angle; and
an arm having a longitudinal axis, the arm having an engaging portion fixed thereto, the engaging portion being oriented to the arm at a second characteristic angle, the arm having an upper portion extending away from the engaging portion along the longitudinal axis of the arm and a lower portion extending away from the engaging portion along the longitudinal axis of the arm, the upper portion extending in an opposite direction to the lower portion;
wherein the engaging portion of the arm is arranged to engage with the supporting portion of the base, such that the arm is able to rotate about the operating axis, and
wherein the base is arranged to locate atop a pole portion, the pole portion having a longitudinal axis, the base being arranged to rotate about the longitudinal axis of the pole portion.

2. A mechanism for lowering a pole as claimed in claim 1, wherein the first characteristic angle is greater than 90°.

3. A mechanism for lowering a pole as claimed in claim 2, wherein the first characteristic angle is less than 135°.

4. A mechanism for lowering a pole as claimed in claim 3, wherein the first characteristic angle is in the range of 100° to 120°.

5. A mechanism for lowering a pole as claimed in claim 4, wherein the first characteristic angle is in the range of 110° to 115°.

6. A mechanism for lowering a pole as claimed in claim 1, wherein the second characteristic angle is within 10° of being supplementary to the first characteristic angle.

7. A mechanism for lowering a pole as claimed in claim 6, wherein the second characteristic angle is supplementary to the first characteristic angle.

8. A mechanism for lowering a pole as claimed in claim 1, wherein the engaging portion includes a first cylindrical portion and a second cylindrical portion, the second cylindrical portion arranged to locate within the supporting portion, and the first cylindrical portion being between the second cylindrical portion and the upper and lower portions of the arm, the first cylindrical portion having a larger diameter than the second cylindrical portion.

9. A mechanism for lowering a pole as claimed in claim 8, wherein the engaging portion includes an annular recess between the first and second cylindrical portions within which an outer edge of the supporting portion may locate.

10. A mechanism for lowering a pole as claimed in claim 1, wherein the base has an internal annular step against which a top of the pole portion may locate.

11. A mechanism for lowering a pole as claimed in claim 1, wherein the mechanism includes rotation limiting means to limit the degree of rotation of the base about the pole portion.

12. A mechanism for lowering a pole as claimed in claim 11, wherein rotation of the base relative to the pole portion is limited to less than 720°.

13. A mechanism for lowering a pole as claimed in claim 11, wherein rotation of the base relative to the pole portion is permitted through more than 360°.

14. A mechanism for lowering a pole as claimed in claim 11, wherein the rotation limiting means includes a rotation stop fixed to the base portion.

15. A mechanism for lowering a pole as claimed in claim 14, wherein the rotation limiting means includes an intermediate rotating stop.

16. A mechanism for lowering a pole as claimed in claim 14, wherein the intermediate rotating stop is arranged to rotate between 270° and 360° relative to the pole portion; and the base portion is arranged to rotate between 270° and 360° relative to the intermediate rotating stop.

17. A pole arrangement incorporating a lowering mechanism to allow movement from a raised configuration whereby an end of the pole is out of easy reach to a lowered position whereby said end is within easy reach, the pole arrangement including:
a pole portion fixed to a base location, the pole portion having a longitudinal axis;
a base of the lowering mechanism, the base having a longitudinal axis coaxial with the longitudinal axis of the pole portion, the base having a supporting portion fixed thereto, the supporting portion having a longitudinal axis which defines an operating axis, the operating axis being oriented to the longitudinal axis of the base at a first nonzero characteristic angle; and
an arm having a longitudinal axis, the arm having an engaging portion fixed thereto, the engaging portion being oriented to the arm at a second characteristic angle, the arm having an upper portion extending away from the engaging portion along the longitudinal axis of the arm and a lower portion extending away from the engaging portion along the longitudinal axis of the arm, the upper portion extending in an opposite direction to the lower portion;
a pole member fixed to the arm, the pole member extending away from the arm along the longitudinal axis of the arm, the pole member having a high end and a low end;
wherein the engaging portion of the arm is arranged to engage with the supporting portion of the base, such that the arm is able to rotate about the operating axis in order to raise or lower the high end of the pole relative to the pole portion, and
wherein the base is arranged to rotate about the longitudinal axis of the pole portion.

18. A pole arrangement incorporating a pole lowering mechanism as claimed in claim 1, the pole arrangement including:
a pole portion fixed to a base location, the pole portion having a longitudinal axis, the base of the pole lowering mechanism being located about an upper end of the pole portion such that the longitudinal axis of the pole portion is coaxial with the longitudinal axis of the base; and a pole member fixed to the arm, the pole member extending away from the arm along the longitudinal axis of the arm, the pole member having a high end and a low end.

* * * * *